United States Patent
Le et al.

(10) Patent No.: US 7,821,151 B2
(45) Date of Patent: Oct. 26, 2010

(54) HYBRID SOLAR THERMAL CHIMNEY

(76) Inventors: John O. Le, 7745 E. Rainview Ct., Anaheim, CA (US) 92808; Christopher M. Le, 7745 E. Rainview Ct., Anaheim, CA (US) 92808; Thomas T. Le, 7745 E. Rainview Ct., Anaheim, CA (US) 92808

( * ) Notice: Subject to any disclaimer, the term of this patent is extended or adjusted under 35 U.S.C. 154(b) by 281 days.

(21) Appl. No.: 12/070,936

(22) Filed: Feb. 23, 2008

(65) Prior Publication Data
US 2009/0212570 A1  Aug. 27, 2009

(51) Int. Cl.
F03D 9/00  (2006.01)
H02P 9/04  (2006.01)
F03B 13/00  (2006.01)
F03B 13/10  (2006.01)

(52) U.S. Cl. .............. 290/55; 290/43; 290/44; 290/54

(58) Field of Classification Search ........ 290/43, 290/44, 54, 55
See application file for complete search history.

(56) References Cited

U.S. PATENT DOCUMENTS

| | | | | |
|---|---|---|---|---|
| 3,979,597 A * | 9/1976 | Drucker | .................. | 290/55 |
| 4,016,725 A * | 4/1977 | Fiss | .................. | 60/690 |
| 4,033,126 A * | 7/1977 | Newland | .................. | 60/398 |
| 4,136,674 A * | 1/1979 | Korr | .................. | 126/607 |
| 4,275,309 A * | 6/1981 | Lucier | .................. | 290/1 R |
| 4,359,870 A * | 11/1982 | Holton, Sr. | .................. | 60/641.12 |
| 4,433,544 A * | 2/1984 | Wells et al. | .................. | 60/641.12 |
| 4,452,046 A * | 6/1984 | Valentin | .................. | 60/641.11 |
| 4,481,774 A * | 11/1984 | Snook | .................. | 60/641.14 |
| 4,483,320 A * | 11/1984 | Wetzel et al. | .................. | 126/584 |
| 4,608,964 A * | 9/1986 | Russo | .................. | 126/688 |
| 4,779,006 A * | 10/1988 | Wortham | .................. | 290/55 |
| 4,935,639 A * | 6/1990 | Yeh | .................. | 290/55 |
| 5,284,628 A * | 2/1994 | Prueitt | .................. | 422/168 |
| 5,300,817 A * | 4/1994 | Baird | .................. | 290/55 |
| 5,395,598 A * | 3/1995 | Prueitt | .................. | 422/168 |
| 5,417,052 A * | 5/1995 | Bharathan et al. | .................. | 60/783 |
| 5,477,684 A * | 12/1995 | Prueitt | .................. | 60/641.14 |
| 5,483,798 A * | 1/1996 | Prueitt | .................. | 60/675 |
| 5,694,774 A * | 12/1997 | Drucker | .................. | 60/641.11 |
| 5,983,634 A * | 11/1999 | Drucker | .................. | 60/398 |
| 6,000,211 A * | 12/1999 | Bellac et al. | .................. | 60/775 |
| 6,201,313 B1 * | 3/2001 | Nakamats | .................. | 290/54 |
| 6,225,705 B1 * | 5/2001 | Nakamats | .................. | 290/43 |
| 6,237,337 B1 * | 5/2001 | Bronicki et al. | .................. | 60/641.12 |
| 6,321,539 B1 * | 11/2001 | Bronicki et al. | .................. | 60/641.8 |
| 6,484,506 B1 * | 11/2002 | Bellac et al. | .................. | 60/772 |

(Continued)

Primary Examiner—T C Patel
Assistant Examiner—Pedro J Cuevas
(74) Attorney, Agent, or Firm—Mark Manley

(57) ABSTRACT

A solar power arrangement for converting solar energy into electricity comprising; a solar chimney, the chimney having a flared base spaced from the ground the chimney including a transparent surface to allow solar energy to heat air within the solar chimney. A first air turbine drives a first generator, and the chimney including an exhaust. The first air turbine drives an air compressor and wherein the compressor includes an ambient air intake and a plurality of pipes for receiving compressed attached to the solar chimney. A plurality of heliostats focus solar energy on the pipes to heat the compressed air contained therein and a second turbine driven by expansion of the compressed air wherein the second turbine drives a second generator.

14 Claims, 3 Drawing Sheets

U.S. PATENT DOCUMENTS

| | | | |
|---|---|---|---|
| 6,510,687 B1 * | 1/2003 | Zaslavsky et al. | 60/398 |
| 6,532,740 B1 * | 3/2003 | Sullivan | 60/641.11 |
| 6,590,300 B1 * | 7/2003 | Preito Santiago | 290/55 |
| 6,668,555 B1 * | 12/2003 | Moriarty | 60/641.8 |
| 6,694,738 B2 * | 2/2004 | Bronicki et al. | 60/641.8 |
| 6,772,593 B2 * | 8/2004 | Dunn | 60/641.11 |
| 6,899,097 B1 * | 5/2005 | Mecham | 126/591 |
| 6,941,759 B2 * | 9/2005 | Bellac et al. | 60/772 |
| 6,957,536 B2 * | 10/2005 | Litwin et al. | 60/641.8 |
| 7,171,812 B2 * | 2/2007 | Schubert | 60/641.15 |
| 7,191,597 B2 * | 3/2007 | Goldman | 60/641.8 |
| 7,296,410 B2 * | 11/2007 | Litwin | 60/641.12 |
| 7,340,898 B2 * | 3/2008 | Miller | 60/641.8 |
| 7,340,899 B1 * | 3/2008 | Rubak et al. | 60/641.8 |
| 7,511,387 B2 * | 3/2009 | Fakhrai | 290/54 |
| 7,735,483 B2 * | 6/2010 | Papageorgiou | 126/571 |
| 2002/0046561 A1 * | 4/2002 | Bronicki et al. | 60/39.182 |
| 2005/0150225 A1 * | 7/2005 | Gwiazda et al. | 60/641.1 |
| 2009/0173337 A1 * | 7/2009 | Tamaura et al. | 126/634 |
| 2009/0288695 A1 * | 11/2009 | Jaisinghani | 136/244 |
| 2010/0018205 A1 * | 1/2010 | Chen | 60/641.8 |
| 2010/0043434 A1 * | 2/2010 | Ortiz et al. | 60/641.15 |
| 2010/0071869 A1 * | 3/2010 | Lovisa | 165/48.2 |
| 2010/0117372 A1 * | 5/2010 | McMaster | 290/55 |

* cited by examiner

HYBRID SOLAR THERMAL CHIMNEY

CROSS REFERENCES TO RELATED APPLICATIONS

None

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates to deriving power from solar sources.

2. Brief Description of Prior Art

U.S. Pat. No. 5,300,817 is one prior art attempt to collect solar power using a chimney effect. The housing of the device is constructed partially of glass such that air heated by the sun rises within a chimney. As the air rises in the chimney it can drive a turbine. A problem with the prior art is that these large solar collectors are expensive to build and must take up a large section of land. Therefore it is important to derive the maximum amount of energy from as compact and economical structure as possible, power interruption is also an important consideration. It is also important that a solar generator be able to produce energy in a range of conditions that might include cloudy days, sunny days and days that fluctuate between cloudy and sunny. Often times the prior art requires an expensive buffer such as a battery bank to even out energy flow between sunny and cloudy days, or a thermal storage such as a molten salt tank to even out the energy flow during intermittent cloudiness within a day.

In prior art pure solar thermal chimney towers such as U.S. Pat. No. 5,300,817, all electrical power generation is derived from the mass flow and the pressure differential of the updraft to drive a wind turbine and electrical generator. For a given electrical power generation rate, the diameter of a pure solar thermal chimney tower structure needs to be large to allow for adequate volume of air flow. The pure solar thermal chimney tower structure needs to be high enough to generate adequate buoyancy (pressure differential) in the updraft. The diameter of the flared portion of the pure solar chimney also needs to be large to collect enough solar energy to heat up a large volume of air to generate adequate amount of updraft. Thus a large tall structure is required and the cost of construction makes the arrangement impractical.

It is also known to use a field of heliostats (solar mirrors) to focus solar energy. When the solar input into the solar thermal receiver fluctuates such as from temporary misalignment of heliostats (control or mechanical glitches), or intermittent cloudiness, or rapidly varying grid electrical power demand, a single spool (mechanically coupled compressor and turbine) pure solar Brayton cycle is susceptible to turbine instability or receiver burnout. Thus heliostat arrangements typically require special safety consideration to avoid damaging equipment with the intense focused solar energy. As a result, in practice, heliostats are often taken off line, generating no energy, when conditions are less than optimal. This make many prior art arrangements either expensive to operate or unreliable. Heliostats have to be situated at certain minimum distances from the central receiving tower to prevent the reflected sun rays striking the solar receiver at unfavorable angles, and to avoid the shadow cast by the central receiving tower. The land area adjacent to the central receiving tower in a heliostat field is thus wasted.

Prior art arrangements have failed to be able to provide enough energy benefit to offset the cost of the land used and the structure required.

SUMMARY OF THE INVENTION

The invention includes a solar power arrangement for converting solar energy into electricity comprising; a solar chimney having a flared base spaced from the ground, and the chimney including a plurality of windows to allow solar energy to heat air within the solar chimney. A first air turbine driven by heated air rising in the chimney. The first air turbine drives a first generator to create electrical power to drive a load. The chimney includes a flared upper exhaust. The first air turbine drives an air compressor and the compressor includes an ambient air intake and a plurality of coils containing compressed air looped around an upper portion of the solar chimney. A plurality of heliostats focusing solar energy on the coils to heat the compressed air contained therein and a second turbine driven by expansion of the compressed air wherein the second turbine drives a second generator and wherein a controller controls the speed of the compressor in response to the energy load and in response to the amount of solar energy available.

DESCRIPTION OF THE PREFERRED EMBODIMENT

Figure 1:
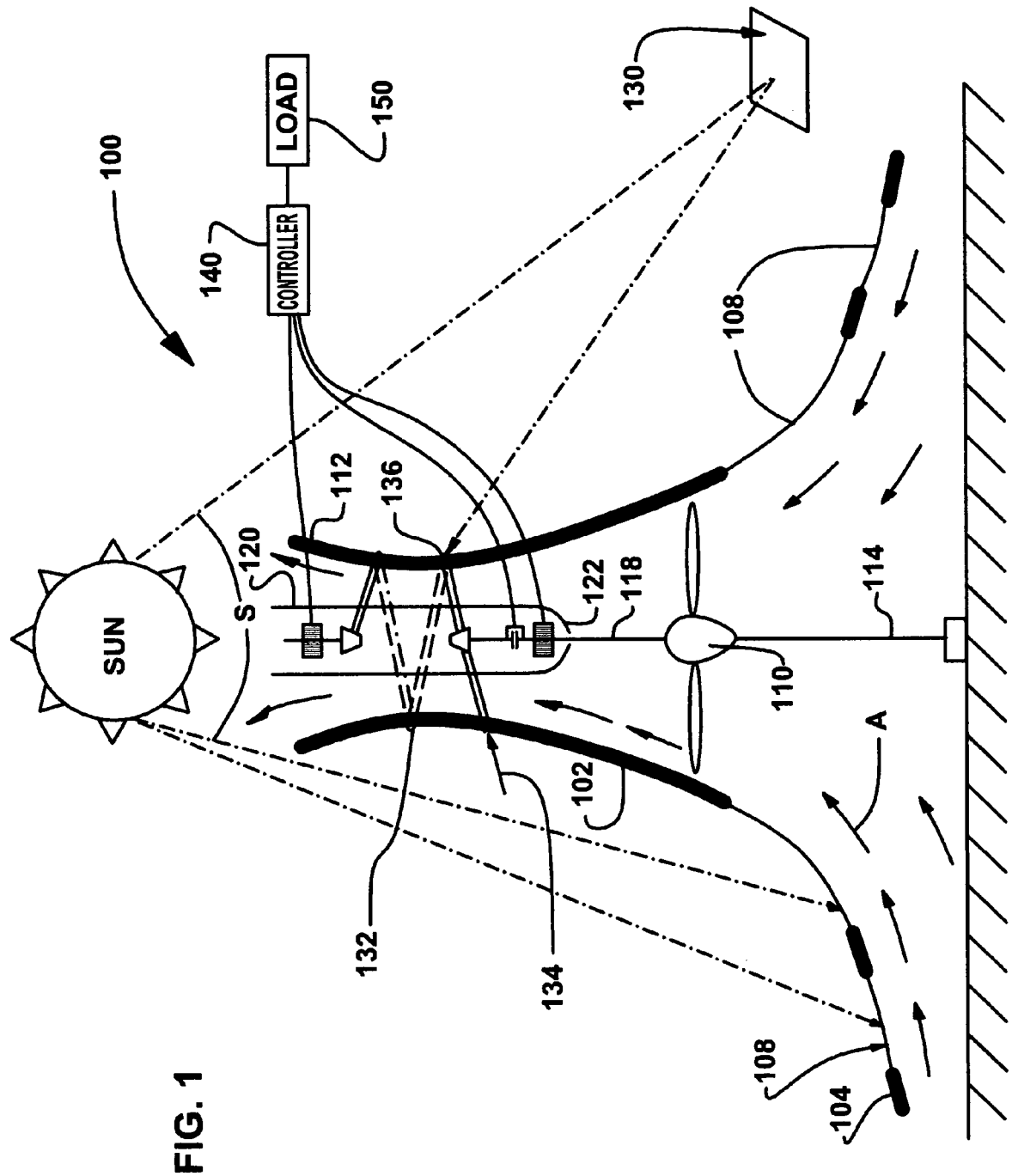
FIG. 1 is a view of the system.

FIG. 1 shows an overall view of the system 100. The system 100 includes a chimney shell 102. The chimney includes a large flared base 104 that is held off the ground to allow for intake air to flow in. Air flow is indicated by arrows 'A'. Air flows upward through the chimney shell 102 driven by solar heating that occurs within the chimney shell 102. Within the chimney shell 102 air can be heated by solar energy 'S' part of which can pass through window portions 108 of the chimney shell 102. Ideally the chimney shell 102 will primarily be glass or similar material that will allow for a maximum amount of net energy transfer into the chimney shell 102. The flared base portion 104 should ideally be almost entirely transparent. Air travels up through the chimney shell 102 and as it does so it powers the wind turbine 110 located within the chimney shell 102. The air then passes out the top end 112 of the chimney shell 102.

Figure 2:
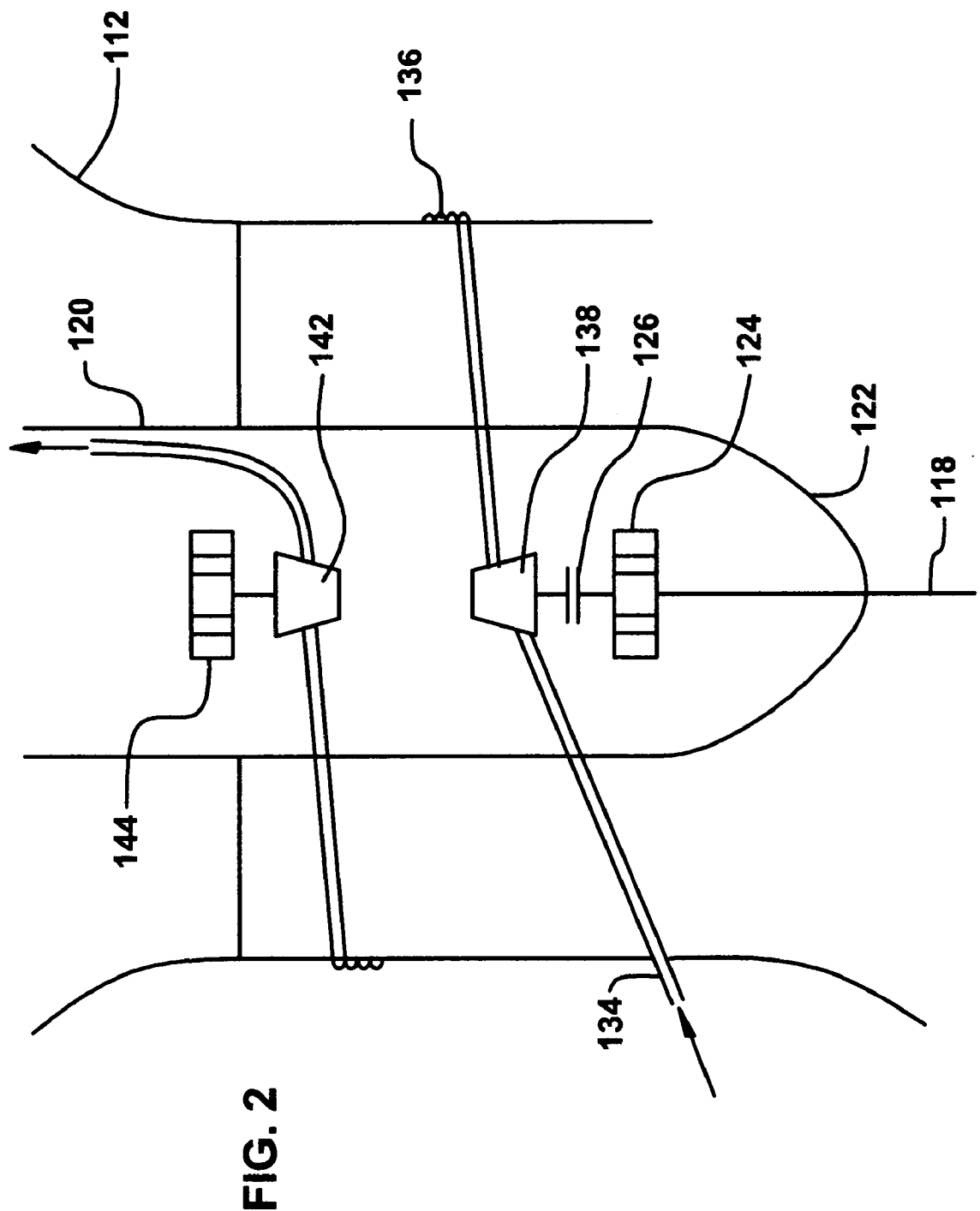
FIG. 2 is a view of details of the system.

The first energy system of the chimney shell 102 is powered by the wind turbine 110. The blade 112 of the wind turbine is horizontal and the diameter of the blade approximately fills the inside diameter of the chimney shell 102. The wind turbine 110 can include a stabilizer 114 connected to the ground. The wind turbine 110 also includes a power shaft 118. A hollow cylindrical housing 120 has a bullet shaped nose portion 122 and contains some of the equipment to transfer power from the shaft 118 to a load 150. FIG. 2 shows details of the equipment within the cylindrical housing 120.

FIG. 1 shows that the system 100 has a second way to capture solar energy, a Brayton like cycle. A plurality of heliostat mirrors 130 track the sun and focus the sun's rays onto a solar receiver 132 on the upper portion of the chimney shell 112. A pipe inlet 134 brings ambient air into the receiver 132. The receiver 132 includes an air compressor that compresses air to be heated by the receiver 132. A plurality of pipe coils 136 carry compressed air in circular paths around the upper portion of the chimney shell 112. The pipe coils 136 form a band, the surface of which is at an advantageous angle to receive solar rays reflected and/or focused by the heliostats. The pipe coils 136 are heated by heliostats 130 along the entire path of the coils 136 heating the air to a very high temperature. The compressed hot air is expanded to spin an air turbine contained within the cylindrical housing 120 details of which are shown in FIG. 2.

FIG. 1 shows that a controller 140 controls the operation of system 100 to optimize power flow to an electrical load 150. The system 100 derives electrical power both from the wind turbine 110 and from the solar heliostats 130 and solar receiver 132. Details of the equipment are shown in FIG. 2 and a flowchart of the operation is shown in FIG. 3.

FIG. 2 shows details of the equipment in the upper portion of the chimney shell 112 including the cylindrical housing 120. The wind turbine power shaft 118 brings rotational power from the wind turbine blade 110 and powers an electrical motor/generator 124. The controller 140 determines how much energy is taken off from the generator by electrical load 150. The shaft 118 also provides power to clutch/transmission 126. If the controller engages the clutch 126, then the shaft 118 is also connected to power the air compressor 138 which supplies air flow to the solar receiver 132. The solar receiver 132 includes an air inlet 134 that provides cool atmospheric air to the compressor 138. The compressor 138 compresses the air and provides it to solar receiver pipe 136 where the air is heated by heliostats 130 as it flows circular loops around the chimney shell 112. The hot compressed air flows to a turbine 142 where it expands and cools and drives a second generator 144.

Figure 3:
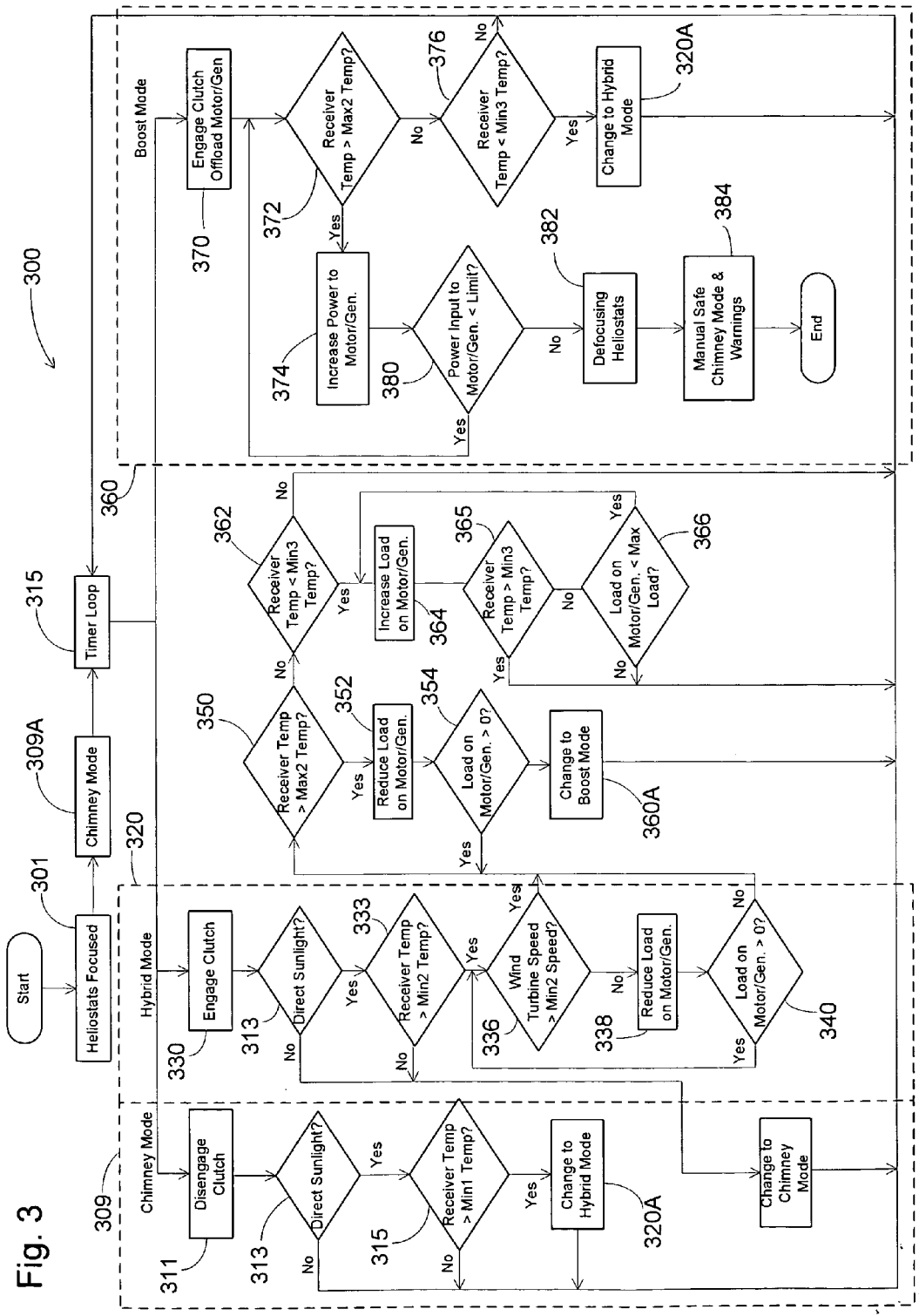
FIG. 3 is a flow chart of the control of the system.

FIG. 3 shows a flow chart of the operation 300 of the system 100. The system 100 starts and focuses the heliostat field 301 and starts the system in chimney mode 309A. In chimney mode 309, the clutch 126 is disengaged 311 such that turbine 138 is not operating. When there is only diffused sunlight available the system 100 operates in chimney mode 309, such as on overcast or cloudy days, the air inside the tower shell structure is heated by the green house effect through the transparent windows. Diffuse light condition is detected by the absence of direct sun light using small sensors for that purpose and/or the absence of high air temperature in the receiver tube. The Hybrid Solar Thermal Chimney system 100 operates as a pure solar thermal chimney on days with only diffused sunlight. The controller 140 commands the clutch/transmission to disengage 322. The thermal updraft spins the wind turbine which drives only the motor/generator to generate electricity feeding the electrical load. The controller 140 then checks for direct sunlight 313 if no sunlight is present, the controller returns to timer loop 315. Time loop provides a dwell time between each condition check such that the system will not rapidly change between modes of operation. Dwell time can be set to optimize operation and might be a few minutes. If direct sunlight is present, then the controller 140 checks that the receiver temperature 315 is above a first minimum temperature, the first minimum temperature would be that which would allow a change to the hybrid mode 320A.

The solar energy transmitted through the transparent windows 108 heats not only the air within the tower chimney shell 112, but also the ground underneath the tower chimney shell 112, including the ground under the flared portion 104. Thus the ground under the tower chimney shell 112 can act as a short term thermal buffer storage to enable the wind turbine 110 to operate at a fairly even speed level when the solar input fluctuates.

When there is direct sunlight reflected to the solar thermal receiver 132 by the heliostats 130, the following hybrid operation 320 (indicated by dashed box) happens:

The controller 140 commands the clutch/transmission 330 to engage so that the wind turbine 110 can also spin the air compressor 138. The air compressor 138 takes in ambient air from inlet 134 outside the tower chimney shell 112 and compresses the air to a higher pressure. The air compressor 138 pushes the compressed air through the solar thermal receiver 132. The controller 140 can then check 313 for direct sunlight. If there is no direct sunlight then the controller will change to chimney mode 309 to be effective after the next 8 dwell time 315. In hybrid mode 320 the controller 140 then checks if temperature exceeds a second minimum temperature 333. If not, then the controller 140 maintains operation in hybrid mode. If the temperature does exceed the second minimum temperature then the controller checks that the wind turbine speed is above a first minimum 336, if the speed is not above a first minimum speed then the controller 140 will reduce the load on the generator 338 so that the turbine speed will increase. So long as the load on the motor/generator is greater than 0 the controller 140 will continue to cycle back to step 336 to check if the wind turbine speed has reached its first minimum speed. When the wind turbine speed at step 336 is above the first minimum speed then the controller 140 checks that the receiver temperature is above a certain preset maximum 350. This preset maximum temperature indicates that the receiver is over heating indicating a need to maximize air flow. The load on the motor generator is further reduced 352 and if it reduces to zero 354 then the controller changes operation to boost mode 360A. In step 350 if the temperature is not above the max2 temperature then the controller 140 will check that the receiver temperature is below a third minimum temperature min3 in step 362, if not the system will stay in hybrid mode 320 and return to dwell timer loop 315. If the temperature is below the third minimum this indicates a cool condition at the receiver that can be improved by reducing airflow through the chimney so the controller 140 increases load on the motor generator 364. The controller 140 can then cycle checking the receiver temperature 365 compared to min 3 temperature and increasing the load 366 until a more ideal temperature is obtained.

In boost mode 360 the clutch is engaged and the motor/generator is offloaded 370. The controller 140 checks that the receiver temperature is above Max 2 in step 372. If the temperature at the receiver is above Max 2 then the controller 140 increases the power 374 to the motor/generator to increase air flow through the chimney and to reduce the temperature at the receiver. The controller 140 then checks the temperature at the receiver is below min 3 at step 376. If the temperature is below min 3 then the controller changes back to hybrid mode 320A. If the receiver temperature is above Max 2 at step 372 and power input to the motor is increased at step 374 then the controller 140 checks that the power input to the motor generator is below its limit, if so the controller 140 checks again the receiver temperature again at step 372. If the power to the motor generator is maximum at step 380, this indicates an unsafe condition where the receiver temperature may go higher and damage the receiver 132, so heliostats 130 are defocused 382 and the system goes into chimney mode and sounds a warning.

Min1 temperature should be around 450-600 deg. C. to indicate that direct sunlight is present. There is no Max1 temperature. Min2 temperature is around 550-700 deg. C. and is the threshold for a positive turbine power output (more mechanical shaft power is being extracted than spent on compressing the air, given the turbo-machinery efficiencies). Max2 temp should be around 1000-1150 deg. C. for non-exotic receiver materials and low cost turbine and more air circulation (boosting) should start. Min3 temp should be in the range of 900-1050 deg. C. Max3 temp. 1200-1250 deg. C., the material limit of low cost turbine, reaching this maximum temperature shows an operational fault or unusual ambient condition. The control 140 should revert to chimney mode only (greenhouse heating alone can't cause overheating) until a manual reset by an operator. The overlapped ranges between modes provide the system hysteresis for a stable operation with less frequent mode switches.

In the solar thermal receiver 132, the compressed air is heated by the solar energy reflected from the heliostats 130 to a higher temperature. Exiting the solar thermal receiver 132, the heated compressed air is routed to and allowed to expand through the air turbine 142. The expansion of the heated compressed air spins the air turbine 142 which in turn drives the main electrical generator 144 to produce electricity to be fed to the electrical load 150. The operation of the Hybrid Solar Thermal Chimney 100 from the air compressor 138 onward is similar to an open air solar Brayton cycle.

The integral motor/generator 124 on the wind turbine shaft 118 may continue producing electricity in conjunction with the main electrical generator 144 if there is enough updraft for the wind turbine 110 to drive both the motor/generator 124 and the air compressor 138 (hybrid mode). The motor/generator 124 is one of the many unique features of Hybrid Solar Thermal Chimney 100. The motor/generator 124 serves three functions.

First the motor/generator 124 together with the disengaged clutch/transmission 126 lets the Hybrid Solar Thermal Chimney 100 operate as a pure solar thermal chimney power generator on days with only diffused sunlight. The first function of the motor/generator 124 is as a pure electrical generator. On days with both diffused and reasonable quantity of direct sunlight, the motor/generator 124 generates electricity to supplement the main generator 144. The amount of generated electricity to be taken out of the motor/generator 124 is determined by the controller 140 depending on the relative availability ratio of diffused versus direct sunlight. If the updraft is only enough for the wind turbine 110 to drive only the air compressor 138 to compress air to the desired pressure, the motor/generator 124 may be completely offloaded to lessen the drag on the wind turbine 110. If there is updraft available in excess of what is required to drive the compressor 138 to compress air to the designed pressure, the controller 140 lets the motor/generator 124 generate electricity. The controller 140 regulates the amount of electricity taken out of the motor/generator 124 so that the resultant electromotive drag torque keeps the (wind turbine) compressor 138 in the desired speed range. This regulated compressor speed is designed to move the appropriate amount of air flow through the solar thermal receiver 132 to be heated to the optimal designed temperature. Too much air flow through the pipe 136 without adequate direct sunlight input to heat the air to an appropriate temperature may decrease the net power output of the solar thermal receiver 132.

The second function of the motor/generator 124 is both as a supplemental electrical generator and as an electromotive speed governor for the air compressor 138. When the availability of direct sunlight is too high, there is a danger of overheating the air in the solar thermal receiver 132. The danger may be the result of not enough updraft to spin the wind turbine 110 faster or the wind turbine 110 may already operate at its aerodynamic design speed limit and cannot spin faster from the force imparted by the updraft to move more air flow through the solar thermal receiver 132. In this case some electricity may be diverted from the main electrical generator 144 output to drive the motor/generator 124 (as a motor) to spin the wind turbine 110 and the air compressor 138 faster. The aerodynamic design speed limit of the wind turbine 110 does not inhibit the wind turbine 110 from spinning faster by the additional force imparted to it by the motor/generator 124. The faster spinning air compressor 138 can move more air through the solar receiver 132, thus keeping the air temperature from getting too high. A small amount of electric power is diverted from the output of the main electrical generator 144 but the higher mass of air flow will enable the Hybrid Solar Thermal Chimney 100 to generate more net electrical power. Since the motor/generator 124 can regulate the wind turbine and compressor speed regardless of the level of direct sunlight input, the Hybrid Solar Thermal Chimney system 100 can operate at near optimum efficiency on majority of the solar energy days. Thus more electricity may be generated from solar energy and transferred to load 150 to do useful work.

The third function of the motor/generator 124 is as a supplement motive force to increase the air flow through the system to not only avoid the over-temperature problem but also generate more net electricity generation on days with very high direct sunlight. Electrical power can be supplied to the motor/generator at startup if required to start the wind turbine 110 turning.

Although the description above contains many specificities, these should not be construed as limiting the scope of the invention but as merely providing illustrations of some of the presently preferred embodiments of this invention.

It would be obvious to those skilled in the art that modifications be made to the embodiments described above without departing from the scope of the present invention. Thus the scope of the invention should be determined by the appended claims in the formal application and their legal equivalents rather than by the examples given.

We claim:

1. A solar power arrangement for converting solar energy into electricity comprising;

a solar chimney said chimney having a flared base spaced from the ground, said chimney including a plurality of windows to allow solar energy to heat air within the solar chimney, a first air turbine driven by said heated air rising in said chimney wherein said first air turbine drives a first generator to create electrical power to drive a load, said chimney including an exhaust;

wherein said first air turbine drives an air compressor and wherein said compressor includes an ambient air intake and a plurality of coils containing compressed air looped around an upper portion of said solar chimney, a plurality of heliostats focusing solar energy on said coils to heat the compressed air contained therein and a second turbine driven by expansion of said compressed air wherein said second turbine drives a second generator and wherein a controller controls the speed of said compressor and energy from said first turbine in response to said energy load and in response to the amount of solar energy available to said second turbine wherein said first turbine includes a power shaft driving said first generator and a clutch and transmission selectively control an amount of power from said shaft driving said compressor.

2. The solar arrangement of claim 1 wherein the ground acts as a thermal buffer to heat air under said flared base.

3. The solar power arrangement of claim 1 wherein said controller can open said clutch to interrupt transmission of energy to said air compressor in response to an interruption of solar power such as during cloudy conditions and wherein said controller can divert all of the power from said shaft to said first generator.

4. The solar power arrangement of claim 1 wherein said second turbine can provide electrical power to said first generator to turn said first turbine at a speed greater than allowed by said heated air rising alone.

5. The solar power arrangement of claim 1 wherein the rate of air flow through the second turbine is controlled by the rate at which the first turbine turns.

6. A solar power arrangement for converting solar energy into electricity comprising;
a solar chimney said chimney having a flared base spaced from the ground, said chimney including a transparent surface to allow solar energy to heat air within the solar chimney, a first air turbine wherein said first air turbine drives a first generator, said chimney including an exhaust;
wherein said first air turbine drives an air compressor and wherein said compressor includes an ambient air intake and a plurality of pipes for receiving compressed air looped around an upper portion of said solar chimney, a plurality of heliostats focusing solar energy on said pipes to heat the compressed air contained therein and a second turbine driven by expansion of said compressed air wherein said second turbine drives a second generator and wherein a controller controls the speed of said compressor in response to said energy load and in response to the amount of solar energy available and wherein the rate of air flow to the second turbine is controlled by the rate at which the first turbine drives the air compressor wherein said first turbine includes a power shaft driving said first generator and a clutch and transmission to selectively control the amount of power from said shaft driving said compressor.

7. The solar power arrangement of claim 6 wherein said second turbine can provide electrical power to said first generator to turn said first turbine.

8. The solar arrangement of claim 7 wherein the ground acts to store thermal energy to heat air under said flared base.

9. The solar power arrangement of claim 8 wherein said controller can open said clutch to interrupt transmission of energy to said air compressor in response to an interruption of solar power.

10. A solar power arrangement for converting solar energy into electricity comprising;
a solar chimney said chimney having a flared base spaced from the ground, said chimney including a transparent surface to allow solar energy to heat air within the solar chimney, a first air turbine wherein said first air turbine drives a first generator, said chimney including an exhaust;
wherein said first air turbine drives an air compressor and wherein said compressor includes an ambient air intake and a plurality of pipes for receiving compressed attached to said solar chimney, a plurality of heliostats focusing solar energy on said pipes to heat the compressed air contained therein and a second turbine driven by expansion of said compressed air wherein said second turbine drives a second generator and wherein said controller can disengage a clutch to interrupt transmission of energy from said first turbine to said air compressor in response to an interruption of solar power to said second turbine.

11. The solar power arrangement of claim 10 wherein a controller controls the speed of said compressor in response to said energy load and in response to the amount of solar energy available.

12. The solar power arrangement of claim 11 wherein the rate of air flow to the second turbine is controlled by the rate at which the first turbine turns.

13. The solar power arrangement of claim 11 wherein said second turbine can provide electrical power to said first generator to turn said first turbine.

14. The solar arrangement of claim 11 wherein a surface under said chimney acts to store thermal energy to heat air under said flared base.

* * * * *